(12) United States Patent
Cohn

(10) Patent No.: US 7,953,116 B2
(45) Date of Patent: May 31, 2011

(54) INTELLIGENT ACCESS WITHIN A DOCUMENT PACKAGE

(75) Inventor: Richard J. Cohn, Newton Center, MA (US)

(73) Assignee: Adobe Systems Incorporated, San Jose, CA (US)

( * ) Notice: Subject to any disclaimer, the term of this patent is extended or adjusted under 35 U.S.C. 154(b) by 152 days.

(21) Appl. No.: 12/404,204

(22) Filed: Mar. 13, 2009

(65) Prior Publication Data

US 2009/0177636 A1 Jul. 9, 2009

Related U.S. Application Data

(63) Continuation of application No. 11/170,463, filed on Jun. 28, 2005, now Pat. No. 7,525,996.

(51) Int. Cl.
*H04J 3/24* (2006.01)
(52) U.S. Cl. ................................. 370/474; 707/999.1
(58) Field of Classification Search ............... 370/474; 707/999.1
See application file for complete search history.

(56) References Cited

U.S. PATENT DOCUMENTS

| 5,802,299 | A | 9/1998 | Logan et al. |
| 6,237,060 | B1 | 5/2001 | Shilts et al. |
| 6,807,579 | B1 | 10/2004 | Frazier |
| 2002/0059325 | A1 | 5/2002 | Beizer et al. |
| 2003/0237051 | A1 | 12/2003 | LaMarca et al. |
| 2004/0212834 | A1 | 10/2004 | Edwards et al. |

OTHER PUBLICATIONS

Adobe XMP, Adobe Extensible Metadata Platform integration technology built on W3C standards; http://www.adobe.com/products/xmp/pdfs/SAPv8.pdf (2001).
Portable Packaging Format (PPF) Specification, Version 2005.5.20, Adobe Systems Incorporated (2005).
Uniform Resource Identifier (UTRI): Generic Syntax; http://www.ietf.org/rfc/rfc3986.txt (Jan. 2005).
Mailbox Names for Common Services, Roles and Functions; http://www.ietf.org/rfc/rfc2142.txt (May 1997).

*Primary Examiner* — Melvin Marcelo
(74) *Attorney, Agent, or Firm* — Fish & Richardson P.C.

(57) ABSTRACT

The invention features a method and apparatus for receiving a data package, the data package being digital data embedding a plurality of documents and a manifest that includes one or more pairs of identifiers. Each pair comprises an alias-source identifier and an alias-destination identifier, and each alias-destination identifier points to a dynamic content resource within the data package. A target identifier is received in a request to perform an operation with the target identifier as an operand and, if the target identifier matches any of the alias-source identifiers in the one or more pairs of identifiers, the alias-destination identifier paired with the matching alias-source identifier is used instead of the target identifier in performing the operation.

21 Claims, 2 Drawing Sheets

INTELLIGENT ACCESS WITHIN A DOCUMENT PACKAGE

CROSS-REFERENCE TO RELATED APPLICATION

This application is a continuation of and claims the benefit of priority under 35 USC 120 to U.S. patent application Ser. No. 11/170,463 entitled "Intelligent Access Within a Document Package," filed Jun. 28, 2005, now issued U.S. Pat. No. 7,525,996. The disclosure of the prior application is considered part of and is incorporated by reference in the disclosure of this application.

BACKGROUND

The present disclosure relates to identifying and referencing information resources contained within electronic documents.

A uniform resource identifier (URI) provides a simple and extensible way of identifying a specific resource. The URI can be used by other resources to reference the specific resource. For example, an electronic document, such as a hypertext markup language (HTML) document available on the Internet, can include a URI that references a second HTML document also available on the Internet.

Although the URI points to the specific resource, it can occasionally be more efficient to access the specific resource from an alternative location; for example, if a local copy is maintained of the specific resource. In such an instance, one alternative is to modify each URI to reflect the alternative location that the resource can be accessed from. Although this results in the resource being accessed from the alternative location, the process of modifying each URI can be time consuming, and modifying the original URIs may be undesirable.

SUMMARY

In general, in one aspect, the invention features a method and apparatus for receiving a data package, the data package being digital data embedding a plurality of documents and a manifest that includes one or more pairs of identifiers. Each pair comprises an alias-source identifier and an alias-destination identifier, and each alias-destination identifier points to a dynamic content resource within the data package. A target identifier is received in a request to perform an operation with the target identifier as an operand and, if the target identifier matches any of the alias-source identifiers in the one or more pairs of identifiers, the alias-destination identifier paired with the matching alias-source identifier is used instead of the target identifier in performing the operation.

Advantageous implementations of the invention include one or more of the following features. The dynamic content resource may be created by applying a style sheet to data identified by the alias-destination identifier. The dynamic content resource may be created by executing code identified by the alias-destination identifier. The manifest may include a second pair of identifiers, the second pair comprising a second alias-source identifier and a second alias-destination identifier, the second alias-destination identifier pointing to a static content resource within the data package. The static content resource may be an extensible markup language (XML) document. The static content resource may be an embedded graphics file. The manifest may include a third pair of identifiers, the third pair comprising a third alias-source identifier and a third alias-destination identifier, the third alias-source identifier associated with an attribute. A desired attribute may be identified and, if the target identifier matches the third alias-source identifier and the desired attribute matches the attribute, the third alias-destination identifier is used instead of the target identifier in performing the operation.

In general, in another aspect, the invention features a data package which includes a single container file, a plurality of data files embedded within the container file, and a manifest embedded within the container file, where the manifest includes one or more alias identifier/destination identifier pairs.

Advantageous implementations of the invention include one or more of the following features. The alias uniform resource identifier of the alias identifier/destination identifier pair may point towards a dynamic content resource within the single container file. A second alias identifier/destination identifier pair may be appended to the manifest.

Particular embodiments of the invention can be implemented to realize one or more of the following advantages. The original resource identifiers need not be modified to reflect an alternative location of the resource. If a local version of a resource exists, the local resource can be accessed instead of the non-local resource. If the location of a resource has changed, a new location can be specified. A single original resource identifier can reference multiple resources based upon specific attributes. Multiple original resource identifiers can reference a single resource.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
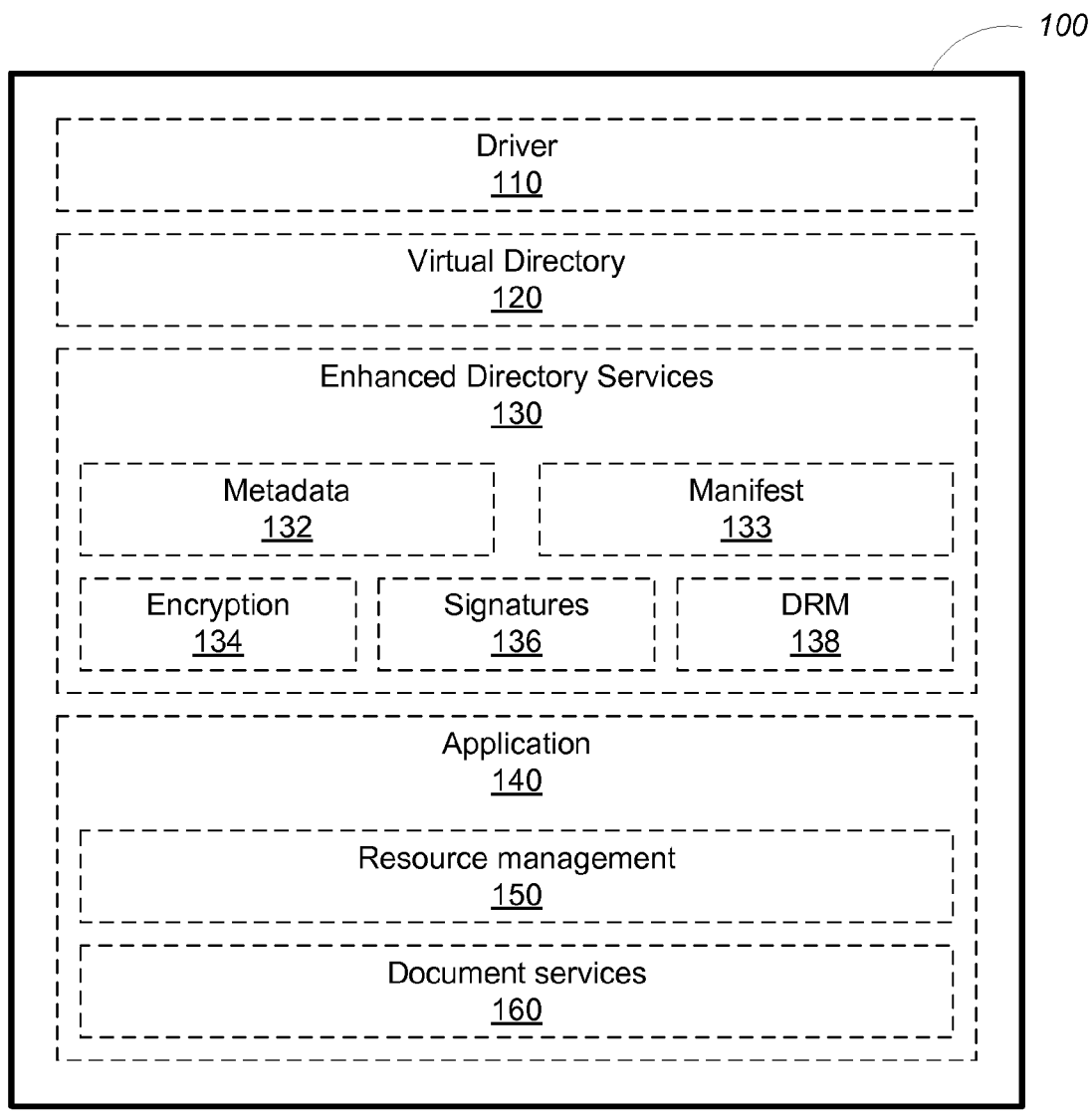
FIG. 1 shows an example data package.

FIG. 1 is a schematic representation of a typical implementation of a data package 100. A data package is a collection of various resources, e.g., text, graphics, interactive forms, or applications. A data package can be a singleton package, containing a single primary document, or a binder, containing multiple documents that maintain their individual integrity even though they are part of a package.

In one implementation, the data package can be accessed locally. For example, the data package can be delivered as an email attachment, or copied from another system via a network file system or downloaded as a single file from a server. In another implementation, the individual resources of the package can be accessed directly from a server.

In one implementation, the data package 100 conforms to the Portable Packaging Format (PPF), a package specification that will be described later in this specification, and that will be referred to as the Portable Packaging Format (PPF) specification. A data package that conforms to this specification will be referred to as a PPF data package. Additional information about PPF may be found in the Portable Package Format Specification, Version 2005.5.20, published by Adobe Systems Incorporated, and incorporated here by reference.

PPF specifies the relationship between a package's core set of resources and the meta-information that describes those resources. In one implementation, the PPF data package is a ZIP-based archive, resulting in a single-file PPF data package. The ZIP specification published by PKWare, Inc is used to archive multiple resources into the single PPF data package file.

In this implementation, a ZIP file starts with a sequence of files, each of which can be compressed or stored in raw format. Each file has a local header immediately before its data, which contains most of the information about the file, including time-stamps, compression method and file name. The compressed file contents immediately follow, and are terminated by an optional data descriptor. The data descriptor contains the CRC and compressed size of the file, which are frequently not available when writing the local file header.

Each file in the archive is laid down sequentially in this format, followed by a central directory at the end of the ZIP archives The central directory is a contiguous set of directory entries, each of which contains all the information in the local file header, plus extras such as file comments and attributes. The central directory contains pointers to the position of each file in the archive which enables random access of files within a ZIP archive.

In an alternative implementation, the PPF data package conforms to the Portable Document Format (PDF) specification, as published by Adobe Systems Incorporated. The PPF data package is a container for all of the individual PPF resources, resulting in a single-file PPF data package. A PPF package using the PDF format can include a representation of the package as a PDF document. Added to this package are the individual PPF resources, stored as streams of data.

In this implementation, the PDF representation of the PPF data package consists of a PDF rendition of the PPF data package plus the resource and meta-information files of the original PPF data package represented as a PDF file attachment. The PDF rendition of the PPF data package provides limited compatibility since there are many features of PPF data packages that cannot be represented in the PDF format. In one implementation, when a PPF package cannot be reasonably rendered in the PDF format, the PDF rendition can be replaced by a single-page document that includes text that explains that a PPF viewer is required to view the data package.

In a third implementation, the PPF data package is an unpacked data package, in which individual resources exist as separate files within a directory on a file system or accessible via a web server. A file-system based package is identified by the directory that contains it. The PPF data package can contain a nested package in single-file or unpacked form. A nested package is also identified by its containing directory.

The functionality that PPF provides can be organized into four layers. A driver layer 110 is the lowest layer. The driver layer 110 contains the specific representations of PPF packages as collections of resources. The driver layer 110 is made up of one or more independent implementations of the portable directory layer. In one implementation, the driver layer makes use of the ZIP format, the PDF format, or the unpackaged format, as described above.

A virtual directory layer 120 contains the basic function of a PPF data package, indicating the organization of resources as files in a set of directories. In one implementation, the set of directories can be nested. Any document or resource that consists of separate streams of data can be represented by the directory layer of PPF.

An enhanced directory services layer 130 contains generic services such as metadata 132, a manifest 133, encryption services 134, digital signature services 136, and digital rights management (DRM) services 138 associated with PPF content. Finally, an application layer 140 contains persistent data required by various services, such as resource management 150 and document services 160. The application layer 140 is generally application-dependent.

The resources contained in the data package can refer to other resources in the package. In one implementation, intra-package references are by relative uniform resource identifiers (URIs), and resources in a package reference resources outside the package using absolute URIs. Additional information about URIs may be found in the Uniform Resource Identifier (URI): Generic Syntax, Request for Comments: 3986 (RFC 3986), available from the Internet Engineering Task Force (IETF) at http://www.ietf.org/rfc/rfc3986.txt. In an alternative implementation, any alternative resource identification scheme can be used, e.g., Uniform Resource Names (URNs). Additional information about URNs may be found in the URN Syntax, Request for Comments: 2141 (RFC 2141), available from the Internet Engineering Task Force (IETF) at http://www.ietf.org/rfc/rfc2141.txt.

The PPF data package is a collection of resources represented as files in a hierarchical directory structure. Resources can be considered either core resources or meta-information. Core resources include content and dependent resources, including style sheets, business logic, form data, and other dependent resources. Content includes anything viewable, such as PDF files and images. Meta-information is any resource that describes content, and meta-information can be either package-wide or resource-specific. In one implementation, meta-information in the PPF data package includes the package manifest, metadata, and digital signatures.

The manifest contains basic information about package resources required to open and manipulate the data package. In one implementation, the manifest can be contained in a single file. In an alternative implementation, the manifest can consist of a master file with references to other files.

In one implementation, a manifest can include basic information about the resources contained in the data package in a representation-independent manner. In an additional implementation, the manifest uses Extensible Markup Language (XML) markup to describe the files in the data package.

The manifest can include additional information about the data package, depending on the features required by the package. In one implementation, the information in the manifest can be modularized using XML namespaces. The primary namespace, or model namespace, can be used to provide package directory information, how resources are encrypted, how resources are packaged into documents, how certain URIs should be resolved, and what features and external resources are required to process a package. The view namespace includes information to be used by an interactive data package processor. This information specifies what actions should be taken when a package is opened.

In an additional implementation, the data package processor can extend the manifest by defining additional namespaces for use in the manifest. While the manifest can be specified as a single XML file, in some circumstances it can be convenient or improve performance to store this information in multiple files, particularly if the package contains a large number of files.

The manifest can include a content locations section. The content locations section provides a way to override the default mechanism for retrieving a resource associated with a URI. When a data package processor encounters a URI, the data package processor looks up the URI in the content locations section to see if it resolves to another URI. The URI can also resolve to dynamic content, created by the application of a style sheet to data or by the execution of code. The content locations section also allows multiple URIs to point to the same resource. If a particular URI is not listed in the content locations section, then the resource associated with the particular URI should either be obtained from the package if the URI is an intra-package reference, or resolved based on the URI scheme if the URI is an external reference.

The content locations section includes the element contentLocation. This element contains zero or more child elements, which can be contentLocations or contentLocation elements. Each contentLocation element specifies a alias-source URI and one or more alias-destination identifiers for the URI. In one implementation, a contentLocations element can include a src attribute, in which case the children of the element are specified by an external file. The value of the src attribute should be a relative reference to the file specifying the children. In one implementation, contentLocation elements can be added, deleted, or amended at any time.

Nesting of contentLocations elements has no semantic significance. A contentLocations section that includes nested contentLocations elements is semantically equivalent to one with a single contentLocations element that includes the same contentLocation elements in the same order. A contentLocations section should not include two contentLocation elements with the same canonicalized alias attribute. If a contentLocations section has two or more contentLocation elements with the same canonicalized alias attribute, the data package processor should ignore all but the first contentLocation element that specify the same alias URI.

An example of a contentLocations element within the manifest follows:

```
<contentLocations>
<!-- alias external URL to internal URL -->
<contentLocation alias="http://example.com/external.jpg"
dest="/Pictures/C3.jpg"/>
<!-- specify print alternative to default URL -->
<contentLocation alias="http://example.com/alternatives.jpg">
<dest href="http://example.com/big.jpg" media="print"/>
<dest href="/Pictures/c4.jpg"/>
</contentLocation>
<!-- alias URL to content generated by XSLT -->
<contentLocation alias="http://example.com/dynamic.dpdf">
<dest href="/data.xml" contentType="application/dpdf+xml">
<stylesheet href="sample.xslt"/>
</dest>
</contentLocation>
</contentLocations>
```

The contentLocation element must have the alias attribute and either the dest attribute or one or more dest elements as child elements; the alias attribute specifies the URI that is to be aliased, and the dest attribute specifies the destination URI that should replace the aliased URI. The dest element is described in further detail below. Both relative and absolute URIs can be aliased and either can map to internal or external resources. An alias can also map to another alias, and the data package processor must determine if the destination of an alias is an alias itself. Note that it is possible to create circular references using aliases. In one implementation, the data package processor detects circular references and signals an error.

Figure 2:
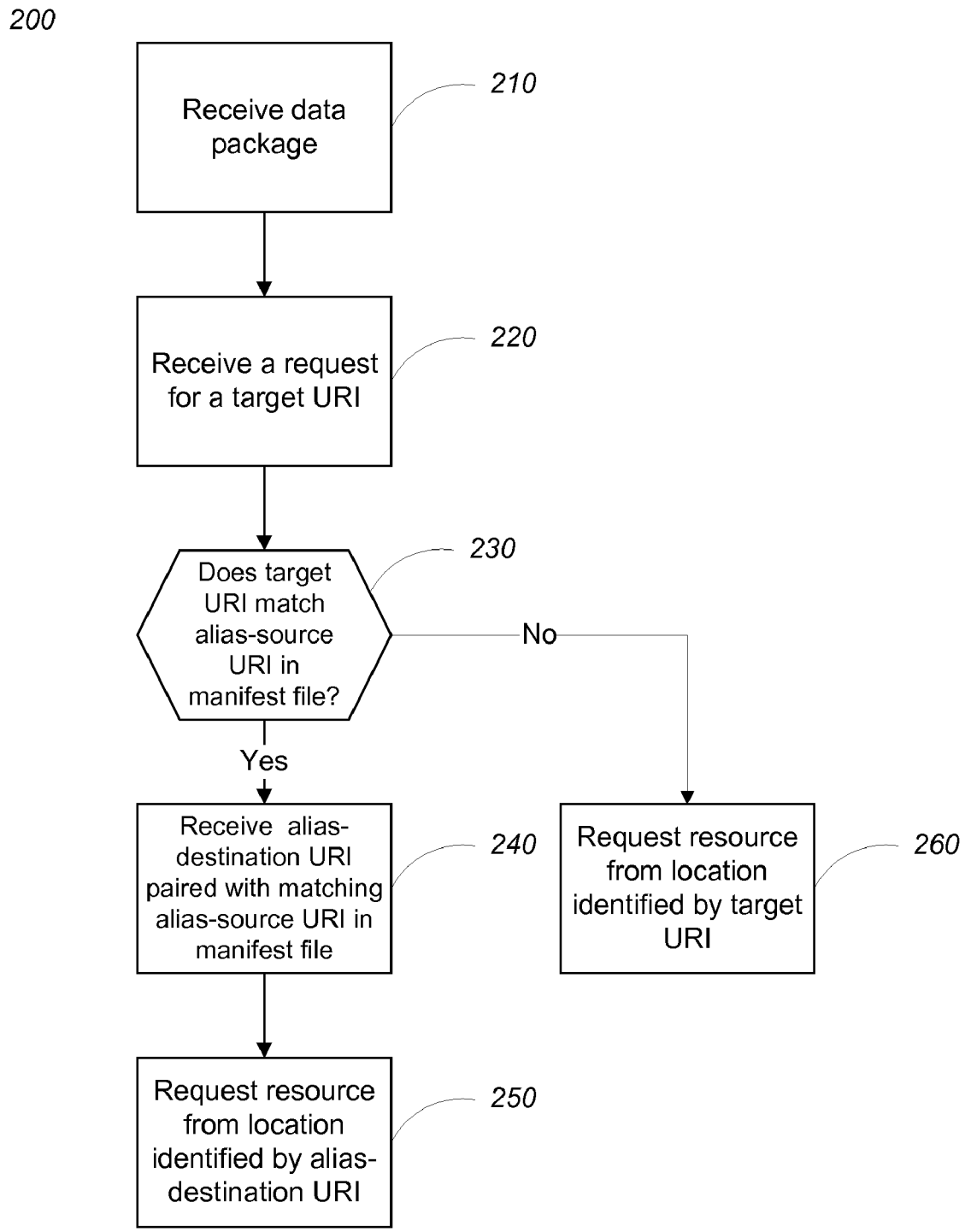
FIG. 2 is a flow chart illustrating the use of alias data within a data package manifest.

FIG. 2 shows a method 200 for using the information contained in the content location section of a manifest. The data package is received by the data package processor (step 210). While the data package processor is processing the data package, the data package processor receives a request for a target URI that points to a desired resource (step 220). Any request that requires a pointer to the desired resource can be received; for example, the request can be to perform a specific operation, with the target URI as an operand of the request. In one implementation, if the URI is a relative URI, it is converted to an absolute URI. The data package processor compares the target URI to each contentLocation element contained in the manifest, and specifically to the alias-source URI of each contentLocation element (step 230). The alias-source URI is contained within the alias attribute of the contentLocation element.

If the target URI matches an alias-source URI for a contentLocation element, the data package processor receives the alias-destination URI paired with the matching alias-source URI (step 240). The alias-destination URI is contained within the dest attribute of the same contentLocation element that contains the target URI within the alias attribute. The data package processor then requests the desired resource from the location identified by the alias-destination URI (step 250). In addition to resolving to static content, the destination URI can resolve to dynamic content, e.g., content created by the application of a style sheet to data or by the execution of code.

If the target URI does not match an alias attribute for a contentLocation element, the data package processor requests the desired resource from the location pointed to by the target URI (step 260). As described above, if a particular URI is not listed in the content locations section, then the resource associated with the particular URI should either be obtained from the package if the URI is an intra-package reference, or resolved based on the URI scheme if the URI is an external reference. In one implementation, steps 230 through 250 are repeated if the alias-destination URI matches another alias-source URI within a contentLocation element. In this implementation, the original alias-destination URI becomes the new target URI, and a new alias-destination URI is received based on the original alias-destination URI. These steps can be repeated as many times as necessary, until the ultimate alias-destination URI does not match any alias-source URIs.

In one implementation, instead of a single dest attribute, the contentLocation element can include one or more child dest elements. The dest element can specify a destination URI or code that when executed creates the content of the resource. If a contentLocation element contains multiple dest elements, each child provides an alternative replacement for the aliased URI. Each alternative is a dest element which can include, e.g., contentType, media, features, extensions, and languages attributes. This allows for alternative alias-destination URIs to be provided for the same alias-source URI, depending on a particular attribute. For example, both low-resolution and high-resolution image files can be provided, depending on whether the image is to be displayed on a screen or printed on a high-resolution printer. If the request for a specific URI is associated with a screen display, the alias-destination URI points towards the lower-resolution image file; if the request for the same URI is associated with a high-resolution printer, however, the alias-destination URI points towards the higher-resolution image file.

The data package processor examines each alternative in turn, and chooses the first alternative that is applicable. An alternative is applicable if all its attributes evaluate to true as explained in Table 1. In one implementation, a default alternative is provided if none of the alternatives are applicable. In an alternative implementation, no alternative is provided if none of the alternatives are applicable, and the desired resource is requested from the original location.

TABLE 1

| Attribute | Value | Evaluation |
| --- | --- | --- |
| contentType | MIME media type of the alternative | True if the user agent can process the specified type |
| media | List of CSS 2.1 media types separated by white space | True if the value is "all" or the target media is included in the list |
| features | List of feature strings separated by white space | True if the user agent implements all the functionality specified by the feature strings |
| extensions | List of URI references separated by white space | True if the user agent implements all the extensions specified |
| languages | List of language names separated by white space | True if user preferences specify one of the languages in the list |

If the dest element specifies a destination URI, the dest element's href attribute provides the destination URI. This element can include one or more child stylesheet elements, each of which specifies a style sheet to apply to the destination URI. The href attribute of the stylesheet element specifies the URI of the style sheet, while the optional hreftype attribute specifies the media type of the style sheet. If multiple style sheets are specified, the data package processor applies them in order of occurrence. Note that the contentType attribute of the dest element specifies the media type of the destination resource after any style sheets are applied.

Alternatively, the dest element can include a child script element. This element specifies executable code that produces the content returned by the aliased URI. A script (text) can be placed inline within the script element, or a script or compiled code can be referenced by an href attribute. The optional type attribute specifies the media type of the code, whether included inline or referred to by URI.

In one implementation, the data package processor supports JavaScript and Java, where Java can be packaged in class files or in JAR files. This code can be included inline if JavaScript, in separate resources in the data package, or in external resources. The exact behavior of the script element depends on the type of code.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in an information carrier, e.g., in a machine-readable storage device, in a machine-readable storage medium, or in a propagated signal, for execution by, or to control the operation of, data processing apparatus, e.g., a programmable processor, a computer, or multiple processors or computers, which apparatus can include, in addition to hardware, general programming, e.g., processor firmware, a protocol stack, a database management system, or an operating system. A propagated signal is an artificially generated signal, e.g., an electrical, optical, or electromagnetic signal, that is made to communicate a computer program directly or indirectly to apparatus by which the program can be stored, executed, or both. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the actions recited in the claims can be performed in a different order and still achieve desirable results.

What is claimed is:

1. A computer-implemented method of referencing a resource, the method comprising:
    receiving, in one or more processors, a data package including:
        a plurality of resources; and
        a manifest that includes a content location identifier having an alias-source identifier and a plurality of alias-destination identifiers, each of the alias-destination identifiers being associated with a destination attribute;
    receiving, in the one or more processors, a target identifier and a target attribute in a request to perform an operation;
    determining that the target identifier matches the alias-source identifier;
    comparing the target attribute with the destination attribute of one or more of the alias-destination identifiers; and
    selecting an alias-destination identifier to replace the target identifier for use in performing the operation based on a result of the comparing.

2. The computer-implemented method of claim 1, wherein:
    each of the alias-destination identifiers is associated with a unique destination attribute.

3. The computer-implemented method of claim 1, further comprising:
    accessing a resource referenced by the selected alias-destination identifier; and
    executing instructions included in the accessed resource to generate a dynamic content resource.

4. The computer-implemented method of claim 1, further comprising:
    accessing a resource referenced by the selected alias-destination identifier; and
    applying a style sheet to the accessed resource to generate a dynamic content resource.

5. The computer-implemented method of claim 1, wherein:
    the selected alias-destination identifier references one of the plurality of resources included in the data package.

6. The computer-implemented method of claim 1, further comprising:
    determining that the selected alias-destination identifier references a resource external to the data package; and
    requesting the referenced resource from a location identified by the selected alias-destination identifier.

7. The computer-implemented method of claim 1 wherein the selecting comprises:
    selecting a default destination identifier for use in performing the operation when the target attribute does not match the destination attribute associated with any of the alias-destination identifiers.

8. A non-transitory computer-readable medium encoding a computer program product operable to cause data processing apparatus to perform operations comprising:
    receiving a data package including:
        a plurality of resources; and
        a manifest that includes a content location identifier having an alias-source identifier and a plurality of alias-destination identifiers, each of the alias-destination identifiers being associated with a destination attribute;
    receiving a target identifier and a target attribute in a request to perform an operation;
    determining that the target identifier matches the alias-source identifier;
    comparing the target attribute with the destination attribute of one or more of the alias-destination identifiers; and
    selecting an alias-destination identifier for use in performing the operation based on a result of the comparing.

9. The non-transitory computer-readable medium of claim 8, wherein:
    each of the alias-destination identifiers is associated with a unique destination attribute.

10. The non-transitory computer-readable medium of claim 8, further operable to cause data processing apparatus to perform operations comprising:
    accessing a resource referenced by the selected alias-destination identifier; and
    executing instructions included in the accessed resource to generate a dynamic content resource.

11. The non-transitory computer-readable medium of claim 8, further operable to cause data processing apparatus to perform operations comprising:
    accessing a resource referenced by the selected alias-destination identifier; and
    applying a style sheet to the accessed resource to generate a dynamic content resource.

12. The non-transitory computer-readable medium of claim 8, wherein:
    the selected alias-destination identifier references one of the plurality of resources included in the data package.

13. The non-transitory computer-readable medium of claim 8, further operable to cause data processing apparatus to perform operations comprising:
    determining that the selected alias-destination identifier references a resource external to the data package; and
    requesting the referenced resource from a location identified by the selected alias-destination identifier.

14. The non-transitory computer-readable medium of claim 8, further operable to cause data processing apparatus to perform operations comprising:
    selecting a default destination identifier for use in performing the operation when the target attribute does not match the destination attribute associated with any of the alias-destination identifiers.

15. A system comprising:
    a computer-readable medium storing a data package including:
        a plurality of resources; and
        a manifest that includes a content location identifier having an alias-source identifier and a plurality of alias-destination identifiers, each of the alias-destination identifiers being associated with a destination attribute; and processor electronics configured to perform operations comprising:
- receiving a target identifier and a target attribute in a request to perform an operation;
- determining that the target identifier matches the alias-source identifier;
- comparing the target attribute with the destination attribute of one or more of the alias-destination identifiers; and
- selecting an alias-destination identifier for use in performing the operation based on a result of the comparing.

16. The system of claim 15, wherein:
each of the alias-destination identifiers is associated with a unique destination attribute.

17. The system of claim 15, wherein the processor electronics are further configured to perform operations comprising:
- accessing a resource referenced by the selected alias-destination identifier; and
- executing instructions included in the accessed resource to generate a dynamic content resource.

18. The system of claim 15, wherein the processor electronics are further configured to perform operations comprising:
- accessing a resource referenced by the selected alias-destination identifier; and
- applying a style sheet to the accessed resource to generate a dynamic content resource.

19. The system of claim 15, wherein:
the selected alias-destination identifier references one of the plurality of resources included in the data package.

20. The system of claim 15, wherein the processor electronics are further configured to perform operations comprising:
- determining that the selected alias-destination identifier references a resource external to the data package; and
- requesting the referenced resource from a location identified by the selected alias-destination identifier.

21. The system of claim 15, wherein the processor electronics are further configured to perform operations comprising:
- selecting a default destination identifier for use in performing the operation when the target attribute does not match the destination attribute associated with any of the alias-destination identifiers.

* * * * *